(12) United States Patent
Switzer et al.

(10) Patent No.: US 10,066,475 B2
(45) Date of Patent: *Sep. 4, 2018

(54) BACK UP DIRECTIONAL AND INCLINATION SENSORS AND METHOD OF OPERATING SAME

(71) Applicant: Evolution Engineering Inc., Calgary, Alberta (CA)

(72) Inventors: David A. Switzer, Calgary (CA); Aaron W. Logan, Calgary (CA); Jili Liu, Calgary (CA); Mojtaba Kazemi Miraki, Calgary (CA)

(73) Assignee: EVOLUTION ENGINEERING INC., Calgary, Alberta (CA)

( * ) Notice: Subject to any disclaimer, the term of this patent is extended or adjusted under 35 U.S.C. 154(b) by 42 days.

This patent is subject to a terminal disclaimer.

(21) Appl. No.: 15/588,371

(22) Filed: May 5, 2017

(65) Prior Publication Data

US 2017/0241255 A1   Aug. 24, 2017

Related U.S. Application Data

(63) Continuation of application No. 14/649,507, filed as application No. PCT/CA2013/050942 on Dec. 6, 2013, now Pat. No. 9,708,903.

(Continued)

(51) Int. Cl.
*E21B 47/024* (2006.01)
*E21B 47/12* (2012.01)
(Continued)

(52) U.S. Cl.
CPC ......... *E21B 47/022* (2013.01); *E21B 47/011* (2013.01); *E21B 47/12* (2013.01)

(58) Field of Classification Search
CPC .................. E21B 47/024; E21B 47/12
(Continued)

(56) References Cited

U.S. PATENT DOCUMENTS

| 5,467,083 A | 11/1995 | McDonald et al. |
| 5,585,726 A * | 12/1996 | Chau ........... E21B 47/02224 175/45 |

(Continued)

FOREIGN PATENT DOCUMENTS

| CN | 202510107 | 10/2012 |
| GB | 2156516 | 10/1985 |

(Continued)

OTHER PUBLICATIONS

Boling, Brian. "An innovative high-temperature high pressure measurement while drilling (MWD) tool; final technical report." Schlumberger Technology Corp.; Prepared for U.S. Dept. of Energy; Jul. 16, 2008.

(Continued)

*Primary Examiner* — Randy Gibson
*Assistant Examiner* — Gedeon M Kidanu
(74) *Attorney, Agent, or Firm* — Jeffer Mangels; Butler & Mitchell LLP; Brennan C. Swain, Esq.

(57) ABSTRACT

The embodiments described herein generally relate to a method and apparatus for providing a back up system of Directional and Inclination (D&I) information to be gathered and transmitted in addition to primary D&I sensors currently employed in industry. A downhole probe assembly including primary sensors, back up sensors and a controller is disclosed. The primary sensors comprise primary accelerometers and primary magnetometers configured to gather information relating to each of orthogonal axes X, Y and Z. The back up sensors comprise back up accelerometers configured to gather information relating to each of orthogo- (Continued)

nal axes X, Y and Z, the back up accelerometers being solid state accelerometers. The controller is in electrical communication with the primary sensors and the back up sensors. The controller is configured to receive and process information from the primary sensors and the back up sensors so that information from the back up accelerometers can be used when one or more of the primary accelerometers fail, which may allow drilling operations to continue despite such failure.

19 Claims, 15 Drawing Sheets

Related U.S. Application Data

(60) Provisional application No. 61/734,784, filed on Dec. 7, 2012, provisional application No. 61/817,527, filed on Apr. 30, 2013.

(51) Int. Cl.
    *E21B 47/022* (2012.01)
    *E21B 47/01* (2012.01)

(58) Field of Classification Search
    USPC .................................................. 73/152.54
    See application file for complete search history.

(56) References Cited

U.S. PATENT DOCUMENTS

| | | | |
|---|---|---|---|
| 6,315,062 B1 | 11/2001 | Alft et al. | |
| 6,778,389 B1 | 8/2004 | Glovatsky | |
| 7,252,174 B2* | 8/2007 | Cox | G01V 1/52 181/102 |
| 8,768,647 B1* | 7/2014 | Zaki | G01C 21/16 702/150 |
| 2004/0020063 A1 | 2/2004 | Lewis et al. | |
| 2004/0238222 A1 | 12/2004 | Harrison | |
| 2006/0184336 A1 | 8/2006 | Kolen | |
| 2007/0017671 A1* | 1/2007 | Clark | E21B 47/12 166/248 |
| 2007/0289373 A1* | 12/2007 | Sugiura | E21B 7/062 73/152.46 |
| 2009/0194332 A1* | 8/2009 | Pastusek | E21B 21/08 175/40 |
| 2009/0277629 A1 | 11/2009 | Mendez | |
| 2010/0096186 A1 | 4/2010 | Ekseth | |
| 2010/0097890 A1* | 4/2010 | Sullivan | E21B 17/028 367/82 |
| 2010/0100329 A1 | 4/2010 | Ekseth | |
| 2010/0172210 A1 | 7/2010 | Clark | |
| 2011/0015862 A1* | 1/2011 | Sato | E21B 47/022 702/6 |
| 2011/0257927 A1* | 10/2011 | Bharadwaj | G01C 21/165 702/150 |
| 2011/0295546 A1* | 12/2011 | Khazanov | G01P 1/023 702/141 |
| 2012/0046865 A1 | 2/2012 | Heisig | |
| 2013/0041577 A1 | 2/2013 | Puhalla | |
| 2013/0048381 A1* | 2/2013 | Habernal | E21B 47/01 175/50 |
| 2013/0151157 A1* | 6/2013 | Brooks | E21B 47/022 702/9 |

FOREIGN PATENT DOCUMENTS

| | | | |
|---|---|---|---|
| GB | 2156516 A | * 10/1985 | ............ E21B 47/12 |
| WO | 2009006077 | 1/2009 | |
| WO | 2010057055 | 5/2010 | |
| WO | 2011129828 | 10/2011 | |
| WO | 2012010898 | 1/2012 | |
| WO | 2012142566 | 10/2012 | |

OTHER PUBLICATIONS

Noureldin, Aboelmagd. "New measurement-while-drilling surveying technique utilizing sets of fiber optic rotation sensors." University of Calgary; Ph.D. Thesis; Mar. 2002.
EP13860175.2 Extended Search Report dated Oct. 14, 2016.
PCT/CA2013/050942 International Search Report & Written Opinion dated Mar. 5, 2014.

* cited by examiner

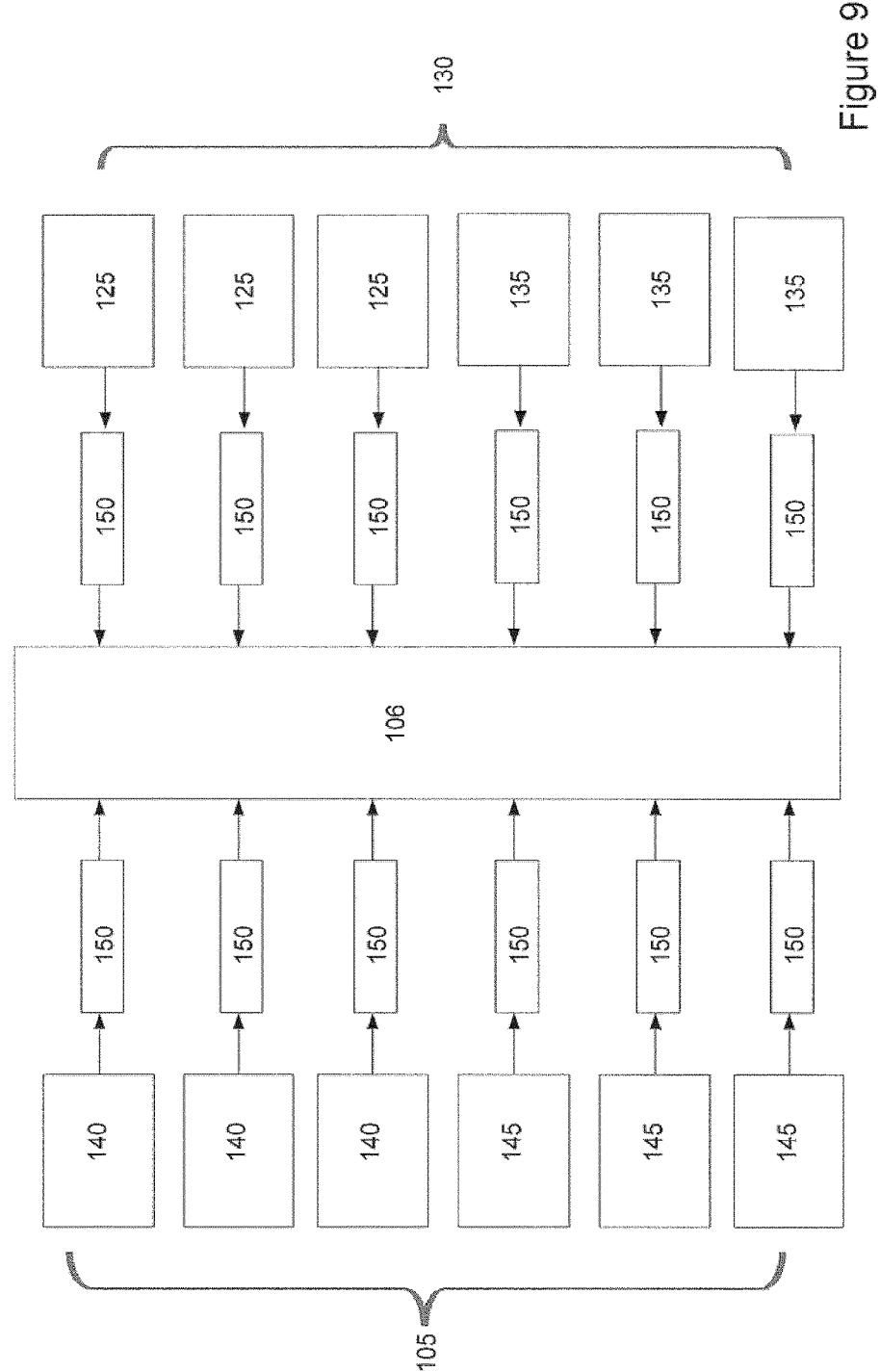

BACK UP DIRECTIONAL AND INCLINATION SENSORS AND METHOD OF OPERATING SAME

FIELD

This invention relates generally to back up Directional and Inclination (D&I) sensors and their use on a probe for downhole drilling, such as a measurement-while-drilling (MWD) tool, and methods of operating such back up D&I sensors.

BACKGROUND

The recovery of hydrocarbons from subterranean zones relies on the process of drilling wellbores. The process uses drilling equipment situated at surface with a drill string extending from the surface equipment to the formation or subterranean zone of interest. The drill string can extend thousands of feet or meters below the surface. The terminal end of the drill string includes a drill bit for drilling (or extending) the wellbore. In addition to this conventional drilling equipment, the system also relies on some sort of drilling fluid, in most cases a drilling "mud" which is pumped through the inside of the drill string, cools and lubricates the drill bit and then exits out of the drill bit and carries rock cuttings back to surface. The mud also helps control bottom hole pressure and prevent hydrocarbon influx from the formation into the wellbore which can potentially cause a blow out at surface.

Directional drilling is the process of steering a well away from vertical to intersect a target endpoint or follow a prescribed path. At the terminal end of the drill string is a bottom-hole-assembly ("BHA") which comprises 1) a drill bit; 2) a steerable downhole mud motor of rotary steerable system; 3) sensors of survey equipment (Logging While Drilling ("LWD") and/or Measurement-while-drilling (MWD)) to evaluate downhole conditions as well depth progresses; 4) equipment for telemetry of data to surface; and 5) other control mechanisms such as stabilizers or heavy weight drill collars. The BHA is conveyed into the wellbore by a metallic tubular.

As an example of a potential drilling activity, MWD equipment is used to provide downhole sensor and status information to surface in a near real-time mode while drilling. This information is used by the rig crew to make decisions about controlling and steering the well to optimize the drilling speed and trajectory based on numerous factors, including lease boundaries, locations of existing wells, formation properties, and hydrocarbon size and location. This can include making intentional deviations from an originally-planned wellbore path as necessary based on the information gathered from the downhole sensors during the drilling process. The ability to obtain real time data during MWD allows for a relatively more economical and more efficient drilling operation.

In both directional and straight (or vertical) holes, the position of the well must be known with reasonable accuracy to ensure the correct well trajectory. While extending the wellbore, evaluation of physical properties such as pressure, temperature and the wellbore trajectory in three-dimensional space are important. The measurements include inclination from vertical and azimuth (compass heading). Measurements are typically made at discrete points with the general path of the wellbore computed from these points. In downhole MWD, the MWD tool surveys the well as it is drilled and information regarding the orientation of the drill bit is relayed back to the driller on surface. Measurement devices typically include a series of accelerometers which measure the inclination of the tool (for example vertical is 0° inclination and horizontal is 90° inclination) and magnetometers which measure the earth's magnetic field to determine azimuth. A typical Directional and Inclination (D&I) sensor package consists of three single axis accelerometers in each of the three orthogonal axes, together with two dual axes magnetometers yielding the three orthogonal axes and one redundant axis, which is typically not used. The sensor package also includes associated data acquisition and processing circuitry. The accelerometers and magnetometers are arranged in three mutually orthogonal directions, and measure the three mutually orthogonal components of the Earth's magnetic field and Earth's gravity. The accelerometer consists of a quartz crystal suspended in an electromagnetic field; measuring the inclination by how much electromagnetic force is required to maintain the crystal in balance. The accelerometers provide measurement of deviation from vertical, or inclination, as well as providing a measurement of the toolface or rotational orientation of the tool. The magnetometers provide a measure of the direction or magnetic heading as well as its orientation when the BHA is at or near vertical. These sets of measurements combined assist the driller for steering as well as for computing location. In most cases, whenever another length of drill pipe is added to the drill string, a survey is taken and the information is sent to surface and decoded by the MWD's operator and converted to information the driller requires for survey calculations. The BHA position is then calculated by assuming a certain trajectory between the surveying points.

In most downhole operations, it is often necessary to insert or introduce gauges, sensors or testing instrumentation into the borehole in order to obtain information of borehole parameters and conditions. Such parameters might include, but are not limited to, temperature, pressure, directional parameters, and gamma radiation. The electrical componentry of the various sensors and gauges used to obtain the information are mounted on or near circuit boards which are contained within an apparatus. The circuit boards may be referred or positionally favoured to one side of the carrier apparatus. The gauges are typically protected as they are imbedded in the wall, and hence completely housed, within the apparatus.

In MWD, known MWD tools contain essentially the same D&I sensor package to survey the well bore but the data may be sent back to surface by various telemetry methods. Such telemetry methods include, but are not limited to, the use of hardwired drill pipe, acoustic telemetry, fibre optic cable, Mud Pulse (MP) Telemetry and Electromagnetic (EM) Telemetry. In some downhole drilling operations there may be more than one telemetry system used to provide a backup system in case one of the wellbore telemetry systems fails or is otherwise unable to function properly. The sensors used in the MWD tools are usually located in an electronics probe or instrumentation assembly contained in a cylindrical cover or housing, located near the drill bit. The surface retrievable probe housing is subject to harsh downhole environments with increased temperature and pressure, excessive shock and vibration, as well as fluid harmonics which are created as drilling fluid passes by the probe. The electronics and sensors of the MWD tool can therefore be easily damaged.

In most current applications of directional drilling, standard D&I sensor packages contain fluxgate magnetometers for directional measurement and quartz flex accelerometers for inclination measurement; with the magnetometers and accelerometers taking measurements in each of the three orthogonal axes (X, Y and Z). In cases where any of the sensors fail, the tool must be removed for replacement or repair of the failed sensor as all sensors must be working for drilling to continue. Removal of the tool involves tripping out of hole, replacing the sensors or the whole MWD tool, and tripping back in which adds considerable time and increases well costs to the operator. The D&I sensors, and in particular the industry standard accelerometers, are a high cost component of the MWD tool and are prone to failure in the extreme environments they are subjected to.

MWD sensors are subjected to a number of internal and external influences which can cause errors associated with their use. Some internal influences include calibration errors, cross-axis sensitivity, temperature drift and output noise. External influences include BHA deflection, geomagnetic influence from magnetic ore in surrounding rock, drill-string induced interference, as well as axial misalignment. To offset some of the resulting effects, various calibration offsets are introduced into the sensor system. Typically the errors are assumed to be distributed normally among all three sensors in the orthogonal triad but this may not always be the case. Additionally, at higher temperature the sensors may deviate from calibrated values due to temperature drift, particularly when the sensors are also subjected to shock and vibration. The sensors may undergo temperature cycling as the probes are deployed and removed from the borehole. There can therefore be loss of calibration with time and use, which can lead to faulty measurements.

WO 2012/057055 describes the requirement to continually calibrate the magnetometers and accelerometers in the downhole survey instrument package to account for constant temperature drift and an apparatus for such calibration of the sensors. WO 2012/142566 relates to methods for calibrating logging measurements from a logging tool for which one of more attributes vary over the course of logging. The variable calibration function may be discrete or continuous and linear or non-linear. WO 2009/006077 describes a calibration method able to perform in situ calibration, analyze the calibration data and adjust at least one parameter based on the detected data. Each of these references is incorporated herein.

SUMMARY

According to one aspect of the invention, there is provided a downhole probe assembly comprising primary sensors, back up sensors and a controller in electrical communication with the primary sensors and the back up sensors. The primary sensors comprise primary accelerometers and primary magnetometers configured to gather information relating to each of orthogonal axes X, Y and Z. The back up sensors comprise back up accelerometers configured to gather information relating to each of orthogonal axes X, Y and Z, the back up accelerometers being solid state accelerometers. The controller is configured to receive and process information from the primary sensors and the back up sensors so that information from the back up accelerometers can be used when one or more of the primary accelerometers fails.

The back up sensors may further comprise back up magnetometers configured to gather information relating to each of orthogonal axes X, Y and Z. The controller may be in electronic communication with the back up magnetometers and configured to receive and process information from the back up magnetometers so that information from the back up magnetometers can be used when one or more of the primary magnetometers fails. The controller may be configured to send a signal to surface to alert an operator that one or more of the primary sensors has failed and that drilling operation is being continued on the basis of information from the back up sensors.

The downhole probe assembly may include a downhole probe assembly module comprising a longitudinally extending housing enclosing a body. The back up sensors may be attached to the body. The back up sensors may be attached to the body in each of the orthogonal axes X, Y and Z. Alternatively, one or more of the back up sensors may be attached to the body at an offset position to the orthogonal axes X, Y and Z. The downhole probe assembly module may further comprise an end cap structure positioned at one end of the housing. The body may form part of the end cap structure and may extend into a portion of the housing. The end cap structure may be a male end cap structure or a female end cap structure configured to respectively mate with a female end cap structure or a male end cap structure of a longitudinally adjacent module of the downhole probe assembly. Mating of the male and female end cap structures may physically and electrically interconnect the downhole probe assembly module and the longitudinally adjacent module. The back up sensors may be fixed to printed circuit boards and the printed circuit boards may be attached to the body.

The back up sensors may be incorporated in a back up sensor module and the back up sensor module may be configured for interconnection with a longitudinally adjacent module of the downhole probe assembly. The back up sensor module may comprise a longitudinally extending housing enclosing a body. The back up sensors may be attached to the body. The back up sensors may be attached to the body in each of the orthogonal axes X, Y and Z. Alternatively, one or more of the back up sensors may be attached to the body at an offset position to the orthogonal axes X, Y and Z. The back up sensor module may further comprise an end cap structure positioned at one end of the longitudinally extending housing. The end cap structure may be a male end cap structure or a female end cap structure configured to respectively mate with a female end cap structure or a male end cap structure of the longitudinally adjacent module of the downhole probe assembly. Mating of the male and female end cap structures may physically and electrically interconnect the back up sensor module with the longitudinally adjacent module. The body may form part of the end cap structure and may extend into a portion of the housing. The back up sensors may be fixed to printed circuit boards and the printed circuit boards may be attached to the body.

The primary sensors and the back up sensors may be incorporated in a sensor module. In one aspect, the sensor module may comprise a body and the primary sensors may be attached to the body and at least one of the back up sensors may be attached to at least one of the primary sensors. The back up sensors may be attached to the primary sensors in each of the orthogonal axes X, Y and Z. Alternatively, at least one of the back up sensors may be attached to at least one of the primary sensors at an offset position to the orthogonal axes X, Y and Z. The back up sensors may be fixed to printed circuit boards and the printed circuit board may be attached to the primary sensors. In another aspect, the sensor module may comprise a body and the primary sensors and the back up sensors may be attached to the body. The back up sensors may be attached to the body in each of the orthogonal axes X, Y and Z. Alternatively, one or more of the back up sensors may be attached to the body at an offset position to the orthogonal axes X, Y and Z. The back up sensors may be fixed to printed circuit boards and the printed circuit board may be attached to the body. At least one of the back up sensors may be attached to the body on the back side of at least one of the primary sensors so that at least one back up sensor and at least one primary sensor are in the same orthogonal axis.

According to another aspect of the invention, there is provided an end cap structure for use in a downhole probe assembly that includes primary accelerometers and primary magnetometers configured to gather information relating to each of orthogonal axes X, Y and Z. The end cap structure comprises: a body configured to fit within and extend into a portion of a longitudinally extending housing of a module of the downhole probe assembly; and back up sensors selected from the group consisting of back up accelerometers, back up magnetometers and a combination thereof. The back up sensors are attached to the body and configured to gather information relating to each of orthogonal axes X, Y and Z.

The back up sensors may be attached to the body in each of the orthogonal axes X, Y and Z. Alternatively, one or more of the back up sensors may be attached to the body at an offset position to the orthogonal axes X, Y and Z. The back up accelerometers may be solid state accelerometers. The end cap structure may be a male end cap structure or a female end cap structure configured to respectively mate with a female end cap structure or a male end cap structure of a longitudinally adjacent module of the downhole probe assembly. Mating of the male and female end cap structures may physically and electrically interconnect the longitudinally adjacent modules. The back up sensors may be fixed to printed circuit boards and the printed circuit boards may be attached to the body.

According to another aspect of the invention, there is provided a back up sensor module for use in a downhole probe assembly that includes primary accelerometers and primary magnetometers configured to gather information relating to each of orthogonal axes X, Y and Z. The back up sensor module comprises: a longitudinally extending housing enclosing a body; and back up sensors selected from the group consisting of back up accelerometers, back up magnetometers and a combination thereof. The back up sensors are attached to the body and configured to gather information relating to each of orthogonal axes X, Y and Z.

The back up sensors may be attached to the body in each of the orthogonal axes X, Y and Z. Alternatively one or more of the back up sensors may be attached to the body at an offset position to the orthogonal axes X, Y and Z. The back up accelerometers may be solid state accelerometers.

The back up sensor module may further comprise an end cap structure positioned at one end of the longitudinally extending housing. The end cap structure may be a male end cap structure or a female end cap structure configured to respectively mate with a female end cap structure or a male end cap structure of a longitudinally adjacent module of the downhole probe assembly. Mating of the male and female end cap structures may physically and electrically interconnect the back up sensor module with the longitudinally adjacent module. The body may form part of the end cap structure and extend into a portion of the housing. The back up sensors may be fixed to printed circuit boards and the printed circuit boards may be attached to the body.

According to another aspect of the invention, there is provided a sensor module for a downhole probe assembly. The sensor module comprises primary sensors and back up sensors. The primary sensors comprise primary accelerometers and primary magnetometers configured to gather information relating to each of orthogonal axes X, Y and Z. The back up sensors are selected from the group consisting of back up accelerometers, back up magnetometers and a combination thereof. The back up sensors are configured to gather information relating to each of orthogonal axes X, Y and Z. The back up accelerometers may be solid state accelerometers.

The sensor module may further comprise a body. In one aspect, the primary sensors may be attached to the body and at least one of the back up sensors may be attached to at least one of the primary sensors. The back up sensors may be attached to the primary sensors in each of the orthogonal axes X, Y and Z. Alternatively, at least one of the back up sensors may be attached to at least one of the primary sensors at an offset position to the orthogonal axes X, Y and Z. The back up sensors may be fixed to printed circuit boards and the printed circuit board may be attached to the primary sensors. In another aspect, the primary sensors and the back up sensors may be attached to the body. The back up sensors may be attached to the body in each of the orthogonal axes X, Y and Z. Alternatively, one or more of the back up sensors may be attached to the body at an offset position to the orthogonal axes X, Y and Z. The back up sensors may be fixed to printed circuit boards and the printed circuit board may be attached to the body. At least one of the back up sensors may be attached to the body on the back side of at least one of the primary sensors so that at least one back up sensor and at least one primary sensor are in the same orthogonal axis.

According to another aspect of the invention, there is provided a body for a downhole probe module for use in a downhole probe assembly that includes primary accelerometers and primary magnetometers configured to gather information relating to each of orthogonal axes X, Y and Z. The body comprises back up sensors attached thereto and configured to gather information relating to each of orthogonal axes X, Y and Z. The back up sensors are selected from the group consisting of back up accelerometers, back up magnetometers and a combination thereof.

BRIEF DESCRIPTION OF DRAWINGS

FIG. 9 is a schematic block diagram of interaction of the back up D&I sensors and primary D&I sensors with a central processing unit (controller) of the electronics subassembly.

DETAILED DESCRIPTION

The embodiments described herein generally relate to a method and apparatus for providing a back up system of Directional and Inclination (D&I) information to be gathered and transmitted in addition to the information from the primary D&I sensors currently employed in industry. Though the disclosed embodiments have application for a Measurement While Drilling (MWD) tool, the back up system could also be used in any downhole probe or tool which contains gauges, sensors and other electrical circuitry connections which are prone to failure.

Apparatus Overview

Figure 1:
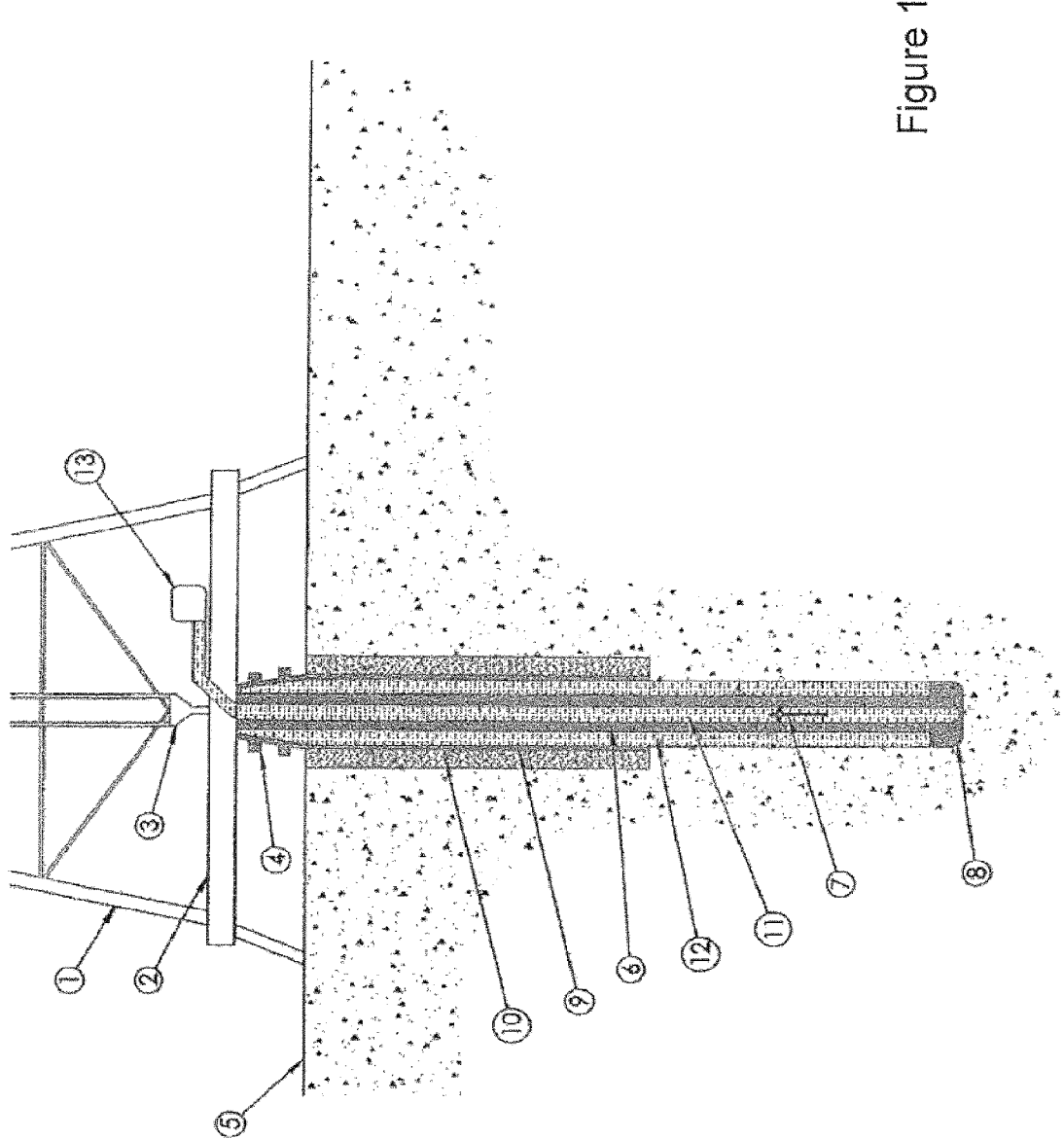
FIG. 1 is a schematic of a drill string in an oil and gas borehole including a downhole probe assembly in accordance with embodiments of the invention.

Referring to the drawings and specifically to FIG. 1, there is shown a schematic representation of a downhole probe assembly 7 used in downhole drilling equipment in accordance with embodiments of the invention. Downhole drilling equipment including a derrick 1 with a rig floor 2 and draw works 3 to facilitate rotation of drill pipe 6 in the ground 5. The drill pipe 6 is enclosed in casing 9 which is fixed in position by casing cement 10. Bore drilling fluid 11 is pumped down drill pipe 6 by pump 13 and passes through downhole probe assembly 7 before reaching drill bit 8 at the end of the drill string. Annular drilling fluid 12 is then pumped back to the surface and passes through a blow out preventer (BOP) 4 positioned above the ground surface. The downhole probe assembly 7 may be a MWD tool as shown in FIG. 2, however in alternative embodiments, the downhole probe assembly 7 may be any downhole probe that utilizes sensors.

Figure 2:
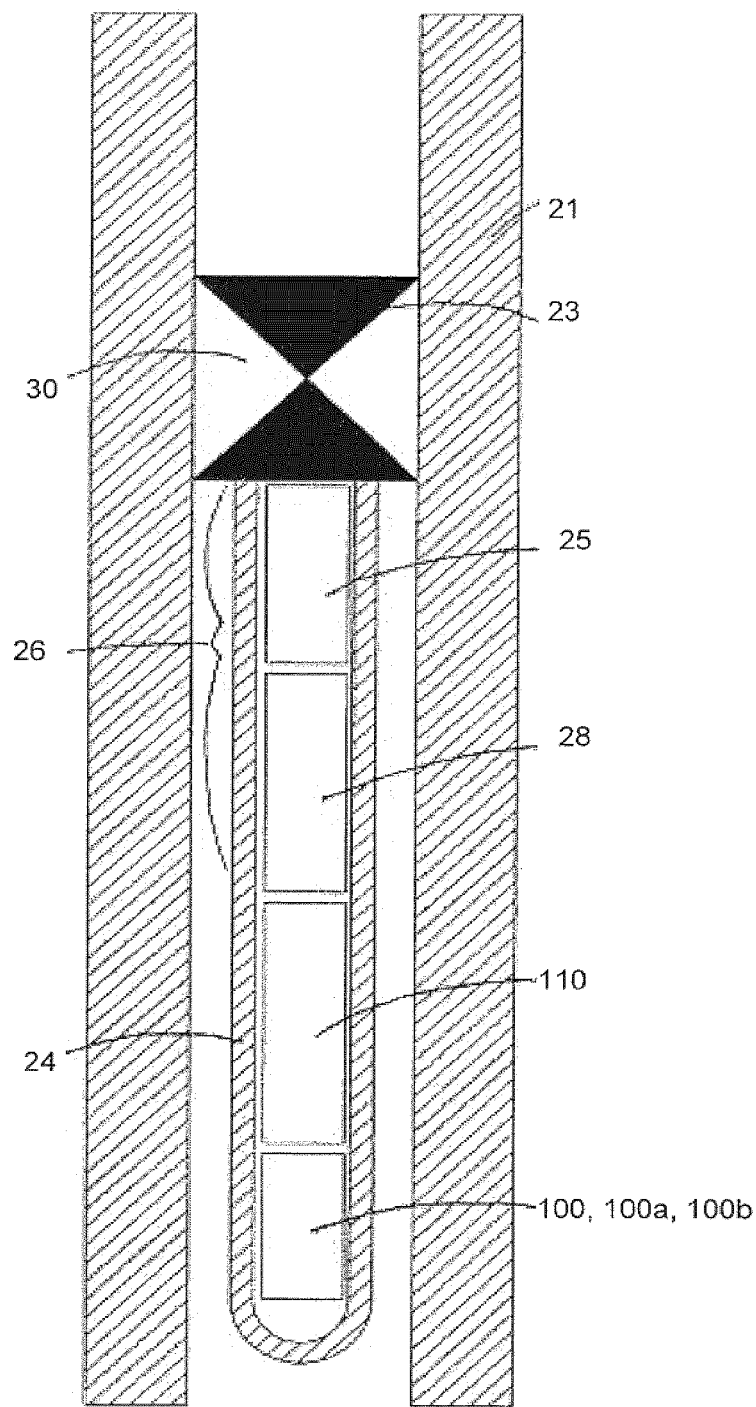
FIG. 2 is a longitudinally sectioned schematic view of a MWD tool in accordance with embodiments of the invention.

Referring to FIG. 2, there is shown a schematic representation of a MWD tool 20 in accordance with embodiments of the invention. In the embodiment shown, the MWD tool 20 is used for mud pulse telemetry whereby a fluid pressure pulse is generated, however alternative MWD tools may incorporate the back up sensor system of the present invention, for example but not limited to an electromagnetic telemetry MWD tool.

The MWD tool 20 is positioned within a drill collar 21 of the drill string and generally comprises a housing 24 enclosing a D&I sensor module 100 or a modified D&I sensor module 100a or 100b longitudinally displaced and in electronic communication with a battery stack 110 and a pulser assembly 26. The pulser assembly 26 drives a fluid pulse generator 30 comprising a fluid pulse valve 23 to generate fluid pressure pulses which are transmitted to the surface and decoded. The pulser assembly 26 comprises an electronics subassembly 28 in electronic communication with a motor subassembly 25.

Electronics Subassembly

Figure 4:
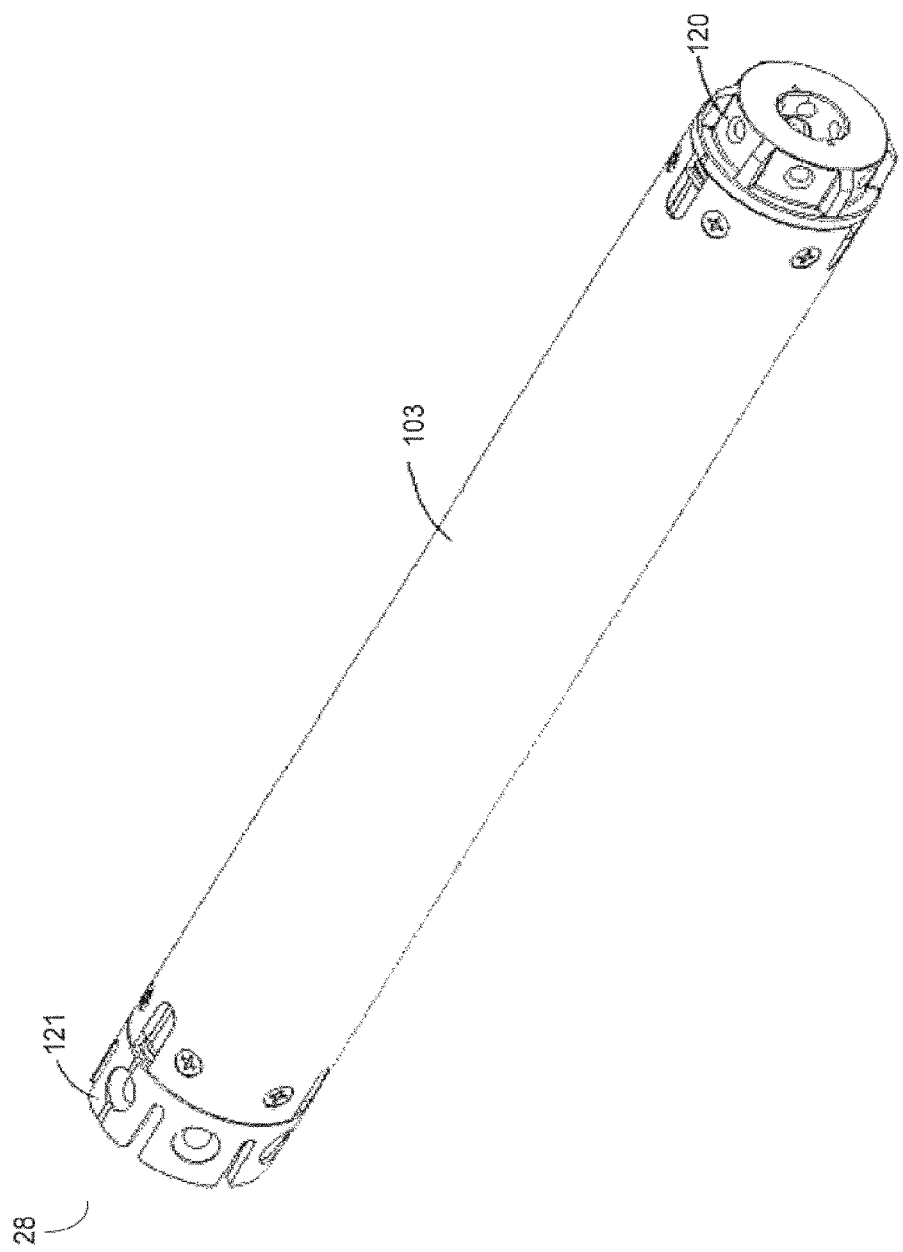
FIG. 4 is a perspective view of the electronics subassembly.
Figure 5:
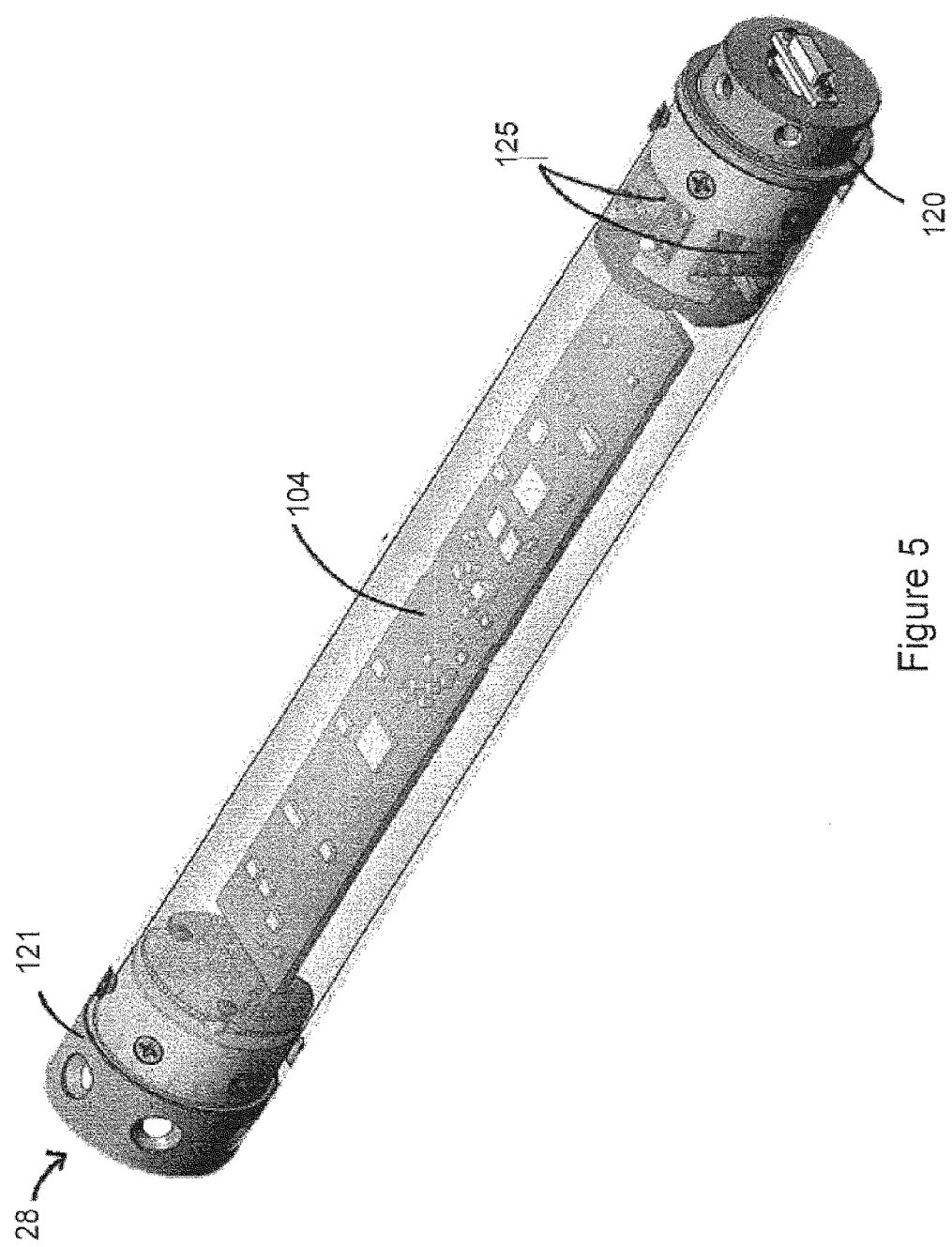
FIG. 5 is a perspective view of the electronics subassembly showing internal parts thereof.

Referring now to FIGS. 4 and 5, the electronics subassembly 28 comprises a housing 103 enclosing a main circuit board 104 secured on a carrier device (not shown). A female end cap structure 121 is fitted at one end of the housing 103 and a male end cap structure 120 is fitted at the other end of the housing 103. The female end cap structure 121 of the electronics subassembly 28 mates with a male end cap structure 120 of an adjoining module of the MWD tool 20 (such as the motor subassembly 25) whereas the male end cap structure 120 of the electronics subassembly 28 mates with a female end cap structure 121 of an adjoining module of the MWD tool 20 (such as the battery stack 110). The end cap structures 120, 121 physically and electronically couple the electronics subassembly 28 with adjacent modules of the MWD tool 20. A portion of the end cap structures 120, 121 fits within the housing 103 and locks the carrier device within the housing 103. The end cap structures 120, 121 may therefore beneficially provide added structural support to minimize the radial and axial movement of the carrier device which has the main circuit board 104 and other electrical components thereon. Axial and radial movement of the carrier device can lead to damage of the main circuit board 104 and other components, therefore the end cap structures 120, 121 may beneficially limit the amount of damage caused by vibration and other downhole conditions. In the embodiment shown in FIG. 5, the male end cap structure 120 includes back up accelerometers 125 and optionally back up magnetometers (not shown) as will be described in more detail below. In an alternative embodiment (not shown), the female end cap structure 121 may include the back up sensors and in yet a further alternative embodiment, the end cap structures 120, 121 may be structural supports only and not house any back up D&I sensors.

Figure 3:
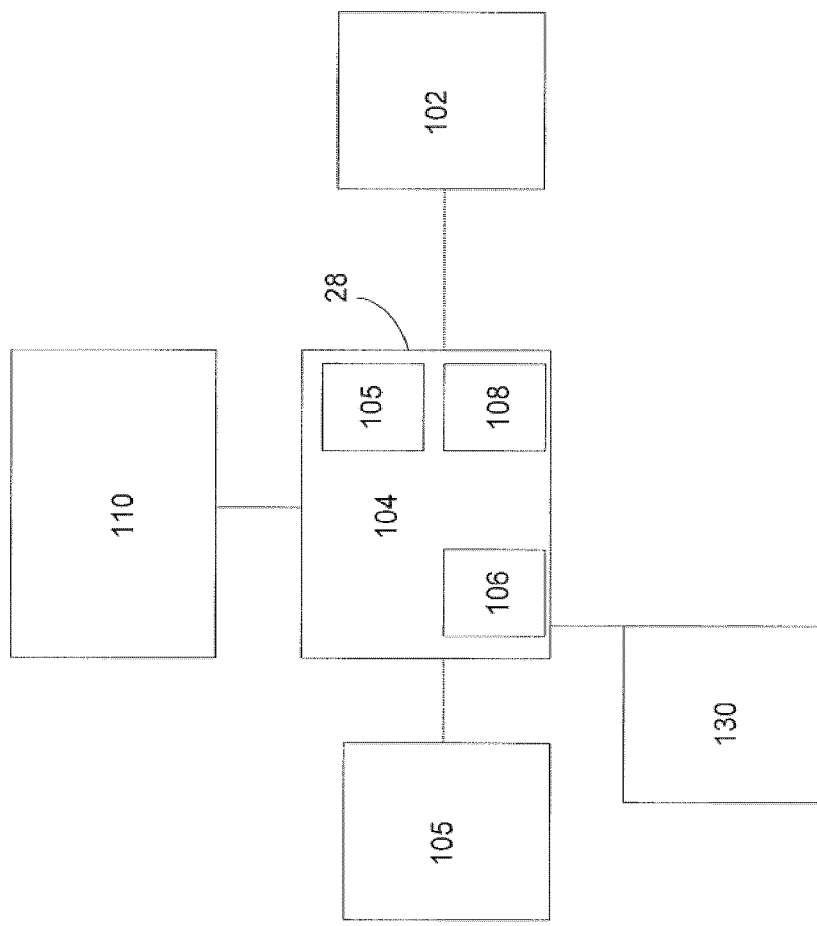
FIG. 3 is a schematic block diagram of components of an electronics subassembly and electronic interactions of the electronic subassembly with other components of the MWD tool.

The main circuit board 104 comprises a printed circuit board with electronic components soldered on the surface of the board. As represented in FIG. 3, the main circuit board 104 contains a data encoder 105, a central processing unit (controller) 106 and a memory 108 having stored thereon program code executable by the controller 106 using power from the battery stack 110. The main circuit board 104 receives information regarding direction and inclination of the drill string from primary D&I sensors 105 and from back up D&I sensors 130, as well as measurements of drilling conditions from a drilling conditions sensor module 102. More specifically, the primary D&I sensors 105, back up D&I sensors 130 and drilling conditions sensor module 102 are each electrically communicative with the main circuit board 104 and send measurement data to the controller 106. The data encoder 105 encodes the information received by the controller 106 into telemetry data. The controller 106 then sends control signals to the motor subassembly 25 to generate pressure pulses using the pulse generator 30 corresponding to the telemetry data. In alternative embodiments, the controller 106 may send control signals for transmission of alternative telemetry data such as EM telemetry data.

D&I Sensor Module

Referring now to FIG. 9, the D&I sensor module 100 includes primary D&I sensors 105 comprising primary accelerometers 140 to measure inclination and primary magnetometers 145 to measure azimuth, as well as associated data acquisition and processing circuitry. For both the primary accelerometers 140 and the primary magnetometers 145, readings are taken which relate to each of the three orthogonal axes X, Y and Z. The primary accelerometers 140 and magnetometers 145 are typically positioned in the sensor module 100 as close as possible to the true orthogonal axes X, Y and Z, however one or more of the primary accelerometers 140 and magnetometers 145 may be positioned offset from the true orthogonal axes either intentionally or as a result of machine tolerance capabilities. The positional offset is typically small, for example a 1 or 2 degree offset from the true orthogonal axis, however the offset may be larger. Readings taken from the primary accelerometers 140 and magnetometers 145 are sent to the controller 106 which uses calibration tables to factor in, for example, the positional offset or temperature drift etc, to provide relative X, Y and Z readings. The relative X, Y and Z readings indicate the direction and inclination of the probe and this information is sent to the surface as telemetry data. The primary accelerometers and magnetometers 140, 145 are industry standard sensors which are highly accurate and typically expensive.

Drilling Conditions Sensor Module

The drilling conditions sensor module 102 includes sensors mounted on a circuit board, or communicative with a circuit board for taking various measurements of borehole parameters and conditions such as temperature, pressure, directional parameters, and gamma radiation. Such sensor modules 102 are well known in the art and thus are not described in detail here. One or more drilling conditions sensors modules 102 may be dispersed throughout the downhole probe assembly 7 as necessary depending on the sensor type, function, and designer choice.

End Cap Structure Incorporating Back UID D&I Sensors

Figure 6:
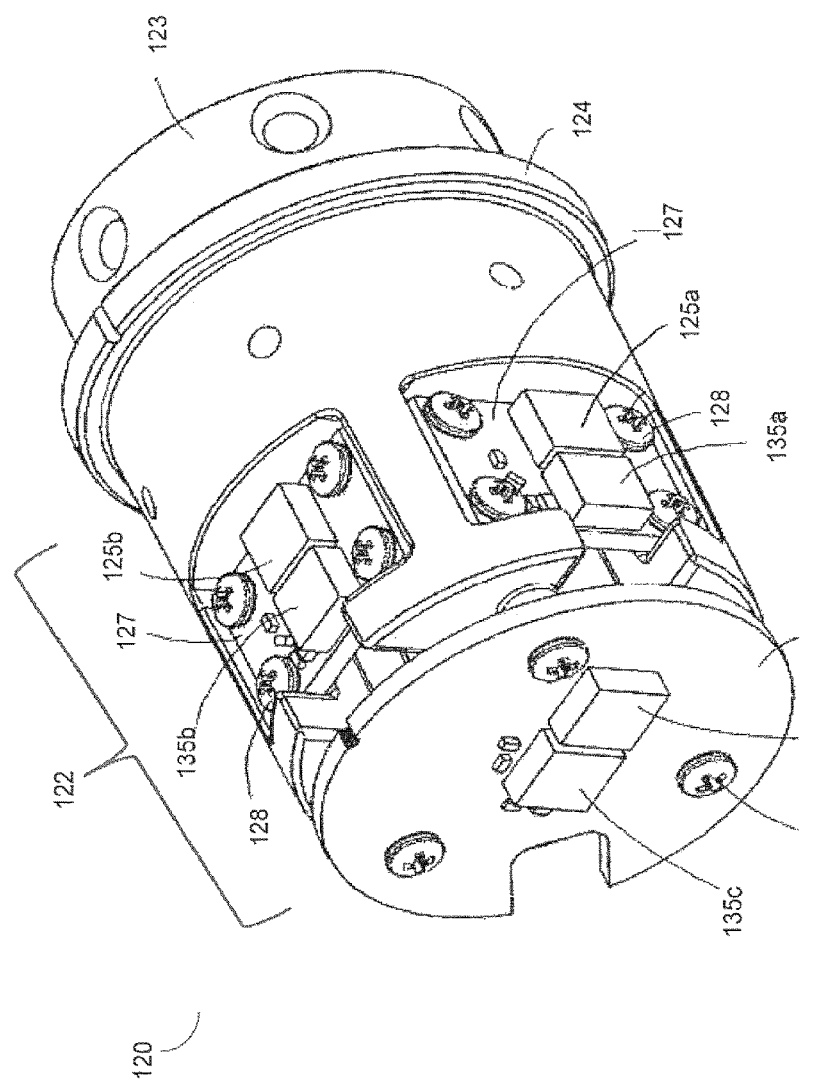
FIG. 6 is a perspective view of a male end cap structure incorporating back up D&I sensors in accordance with one embodiment of the invention.

Referring now to FIG. 6, there is shown a male end cap structure 120 incorporating back up D&I sensors 130 in accordance with one embodiment of the invention. The male end cap structure 120 comprises a cylindrical body having a first section 122 and a second section 123. The first section 122 fits within a portion of housing of a downhole assembly module such as the housing 103 of electronics subassembly 28 as described above with reference to FIGS. 4 and 5, or housing 109 of a back up sensor module 180 as described below with reference to FIGS. 7 and 8. The second section 123 fits within and mates with a female end cap structure 121, thereby physically and electrically interconnecting two adjoining modules in which the end cap structures 120, 121 are fitted. An annular shoulder 124 provides a surface against which the housing 109 or 103 abuts on one side and against which the female end cap structure 121 abuts on the other side.

In alternative embodiments the back up D&I sensors 130 may be attached to a female end cap structure 121 instead of the male end cap structure 120. The male or female end cap structure 120, 121 incorporating the back up D&I sensors 130 may be fitted to the end of any module in the downhole probe assembly 7, for example the electronics subassembly 28 as shown in FIG. 5, or the D&I sensor module 100. The male or female end cap structure 120, 121 incorporating the back up D&I sensors 130 may also form part of a stand alone back up D&I sensor module 180 as described below with reference to FIGS. 7 and 8.

The back up D&I sensors 130 in the embodiment shown in FIG. 6 comprise three back up accelerometers 125a,b,c and three back up magnetometers 135a,b,c fixed to the body of the first section 122 of the end cap structure 120, with each of the three back up accelerometers 125a,b,c and three back up magnetometers 135a,b,c taking readings which relate to one of the three orthogonal axes (X, Y and Z) corresponding to the primary accelerometers 140 and primary magnetometers 145 of the D&I sensor module 100. One of the back up accelerometers 125c and one of the back up magnetometers 135c are fixed side by side to a circular circuit board 126 positioned at one end of the cylindrical body of the first section 122. The other two back up accelerometers 125a,b and back up magnetometers 135a,b are fixed to rectangular circuit boards 127 which are nested within rectangular shaped depressions in the body of the first section 122. The circuit boards 126, 127 are attached to the body of the first section 122 by screws 128. The circuit boards 126, 127 may drive the back up accelerometer and magnetometers 125, 135 as well as functioning as mounting boards for the back up accelerometer and magnetometers 125, 135. In alternative embodiments, the back up accelerometer and magnetometers 125, 135 may be attached to the body of the first section 122 by some other means. In other alternative embodiments the back up magnetometers 135 may be positioned remote from the back up accelerometers 125, such as inside the body of the first section 122. The back up magnetometers 135 may be positioned so as to limit the magnetic interference they encounter. In a further alternative embodiment only back up accelerometers 125 may be provided without back up magnetometers 135 or vice versa. In further alternative embodiments the back up sensors 130 may be attached to a body which is positioned anywhere within a module of the downhole probe assembly 7 and the body need not be connected to the end cap structures 120, 121. The innovative aspects of the invention apply equally in embodiments such as these. The end cap structure 120 may also be equipped with a microcontroller, signal conditioning circuit, multi-channels simultaneous sampling Analog-to Digital converter, serial communication interface and other features (not shown) standard to circuitry and processing. The Analog-to-Digital converter may have an adjustable data sampling rate, programmable amplifier gain and digital filter.

The end cap structures 120, 121 provide structural support as well as housing the back up D&I sensors 130. The end cap structure 120 may also conserve space by physically and electrically interconnecting modules of the MWD tool 20 and may therefore beneficially reduce the length of the MWD tool 20 compared to conventional MWD tools.

Back Up D&I Sensor Module

Figure 8:
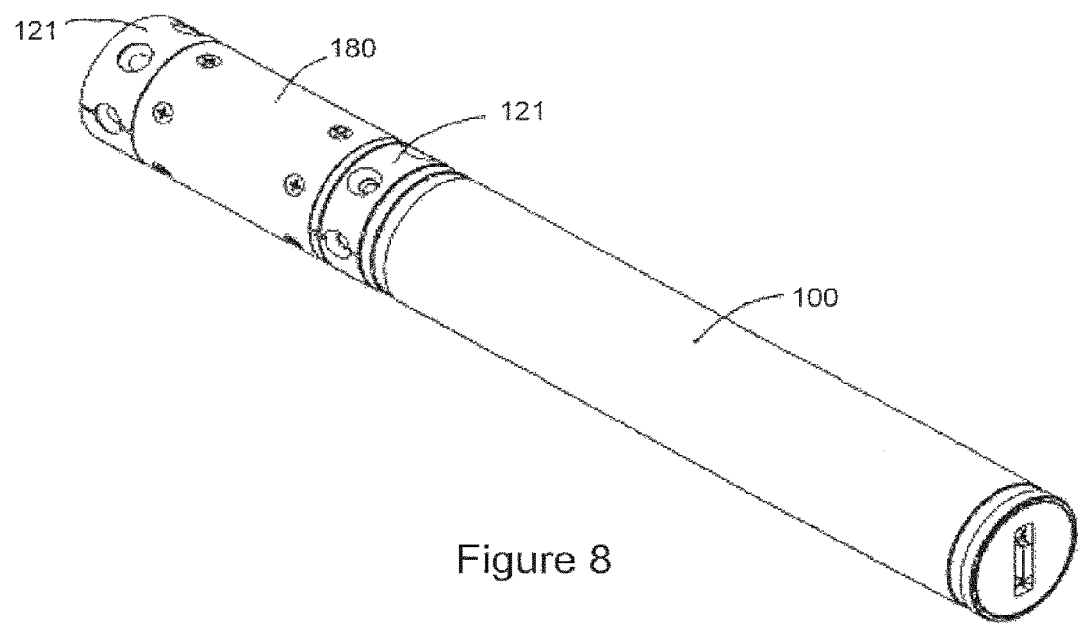
FIG. 8 is a perspective view of the back up D&I sensor module of FIG. 7 connected with a D&I sensor module.
Figure 7:
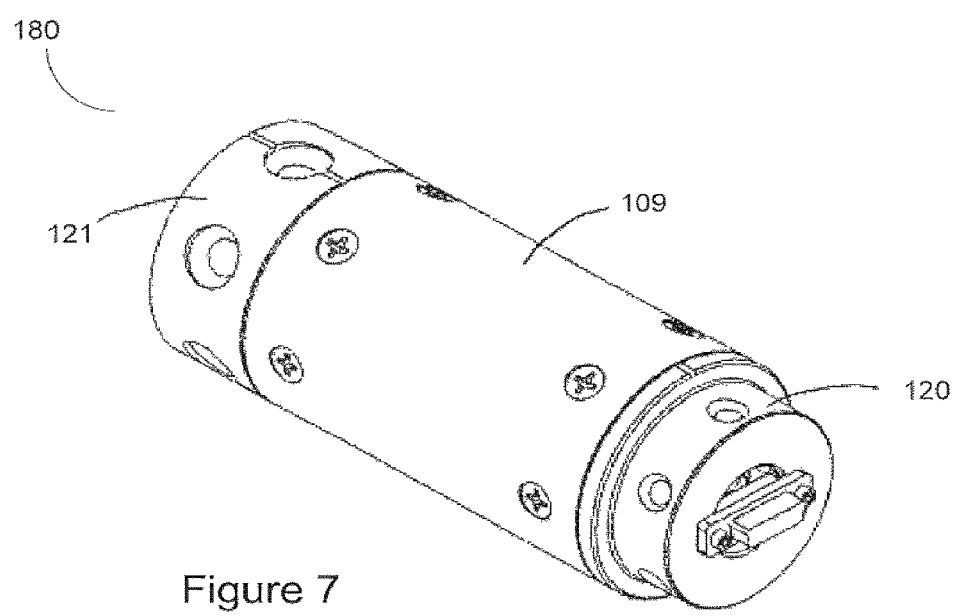
FIG. 7 is a perspective view of a back up D&I sensor module in accordance with another embodiment of the invention.

Referring now to FIGS. 7 and 8, there is shown a back up D&I sensor module 180 in accordance with another embodiment of the invention. The back up D&I sensor module 180 comprises housing 109 with a male end cap structure 120 fitted at one end and a female end cap structure 121 fitted at the other end. Back up D&I sensors 130 may be incorporated on the male end cap structure 120 as shown in FIG. 6 or on the female end cap structure 121 (not shown). The back up D&I sensor module 180 can be connected to longitudinally adjacent modules in the MWD tool 20, for example, in the embodiment shown in FIG. 8, the back up D&I sensor module 180 is connected to the D&I sensor module 100. More specifically, the male end cap structure 120 of the back up D&I sensor module 180 mates with a female end cap structure 121 of the D&I sensor module 100 to physically and electrically interconnect the two modules 180, 100. As the back up D&I sensor module 180 is positioned close to the D&I sensor module 100, the data collected from the back up D&I sensors 130 and from the primary D&I sensors 105 translates to similar positioning of the MWD tool 20.

In alternative embodiments, the back up D&I sensor module 180 may be of different configuration and need not have end cap structures 120, 121. The back up sensors 130 may be attached to a body which is housed within the back up sensor module. The innovative aspects of the invention apply equally in embodiments such as these.

Modified D&I Sensor Module Incorporating Back Up D&I Sensors

Referring now to FIGS. 11 to 16, there is shown a modified D&I sensor module 100a, 100b including back up D&I sensors 130 in accordance with other embodiments of the present invention. In the embodiments shown, the back up D&I sensors 130 comprise back up accelerometers 125 and back up magnetometers 135, however in alternative embodiments, only back up accelerometers 125 may be provided without back up magnetometers 135 or vice versa.

In the embodiment shown in FIGS. 11 to 15 the back up accelerometers 125 and back up magnetometers 135 are respectively fixed directly onto the primary accelerometers 140 and primary magnetometers 145 of the D&I sensor module 100 to produce the modified D&I sensor module 100a. More specifically, two back up accelerometers 125a and 125b are respectively fixed to two primary accelerometers 140a and 140b which are positioned within the modified D&I sensor module 100a. A third back up accelerometer (not shown) is fixed to a third primary accelerometer (not shown) positioned inside the modified D&I sensor module 100a. As shown in FIGS. 14A and 14B, the back up accelerometer 125 is fixed to a printed circuit board 141 and the board 141 is positioned on the body of the primary accelerometer 140. The circuit board 141 may provide signal conditioning with the primary accelerometer 140 and drive the back up accelerometer 125, as well as functioning as a mounting board for the back up accelerometer 125. Two back up magnetometers 135a and 135b are respectively fixed to two primary magnetometers 145a and 145b. The primary magnetometers 145a,b are standard dual axes magnetometers yielding the three orthogonal axes and one redundant axis, which is typically not used. A third back up magnetometer (not shown) may be fixed within the modified D&I sensor module 100a. Alternatively, the back up magnetometers 135a,b may have the same dual axes sensing as the primary magnetometers 145a,b. As shown in FIGS. 15A and 15B, the back up magnetometer 135 is fixed to a printed circuit board 142 and the board 142 is positioned on the four supporting posts 143 of the primary magnetometer 145. The circuit board 142 may provide signal conditioning with the primary magnetometer 145 and drive the back up magnetometer 135, as well as functioning as a mounting board for the back up magnetometer 135. In alternative embodiments, the back up accelerometers and magnetometers 125, 135 may be attached to the primary accelerometers and magnetometers 140, 145 by some other means rather than the printed circuit boards 141, 142, as would be apparent to one of skill in the art.

Figure 16:
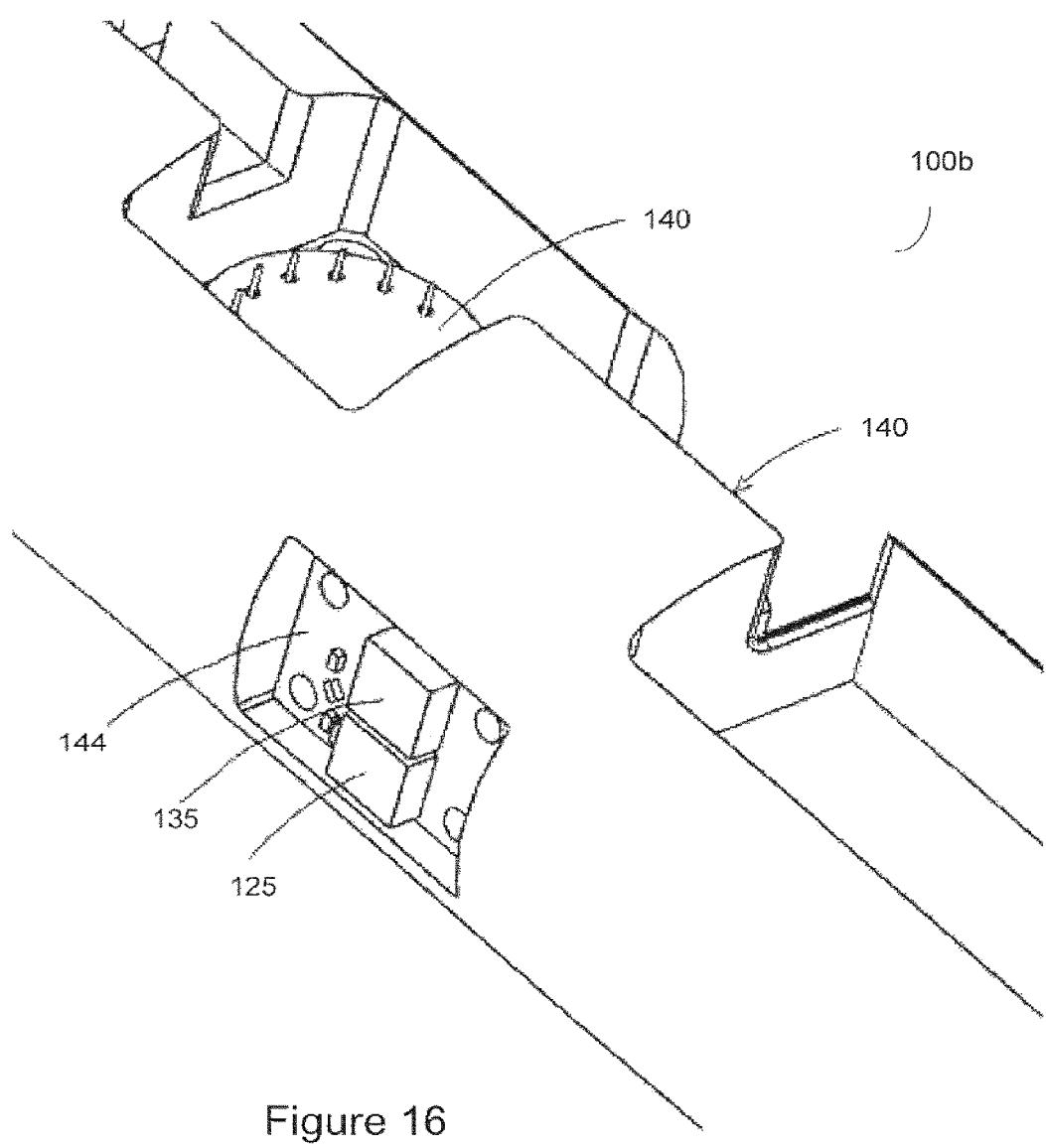
FIG. 16 is a partial perspective view of a modified D&I sensor module incorporating back up D&I sensors in accordance with another embodiment of the invention.

In the modified D&I sensor module 100b shown in FIG. 16, the back up D&I sensors 130 are incorporated in the D&I sensor module 100b, however the back up accelerometers 125 and back up magnetometers 135 are not fixed directly to the primary accelerometers 140 and primary magnetometers 145 but are instead positioned within the module body. In the embodiment shown in FIG. 16, back up accelerometer 125 and back up magnetometer 135 are fixed side by side on a printed circuit board 144 and the circuit board 144 is slotted into a machined pocket of the module body on the back side of the surface on which one of the primary accelerometers 140 is positioned. Additional back up accelerometers and magnetometers 125, 135 fixed to additional circuit boards 144 may be positioned on the back side of the other primary accelerometers 140 or on the back side of the primary magnetometers 145. The circuit board 144 may drive the back up accelerometers and magnetometers 125, 135 as well as functioning as mounting boards for the back up accelerometers and magnetometers 125, 135.

In an alternative embodiment the back up accelerometer 125 and back up magnetometer 135 need not be on the same circuit board 144, but may be fixed to separate circuit boards, with the back up accelerometers 125 being positioned on the back side of the primary accelerometers 140 and the back up magnetometers 135 being positioned on the back side of the primary magnetometers 145. In a further alternative embodiment, the back up accelerometers 125 and/or back up magnetometers 135 may be positioned anywhere within the D&I sensor module and need not be on the back side of the primary accelerometers and/or magnetometers 140, 145. The back up magnetometers 135 may be positioned so as to limit the magnetic interference they encounter.

Operation of Back Up D&I Sensors

The back up accelerometers 125 are generally lower cost sensors than the primary accelerometers 140; the back up accelerometers 125 typically being less accurate, but more reliable and less prone to failure than the primary accelerometers 140 used in the D&I sensor module 100. Such back up accelerometers 125 may be solid state sensors such as, but not limited to, Colibrys MS8000™ or MS9000™ MEMS accelerometers. The back up magnetometers 135 may be the same type of magnetometers as the primary magnetometers 145 or they may be lower cost magnetometers, which are typically less accurate, but more reliable and less prone to failure, than the primary magnetometers 145 used in the D&I sensor module 100. Exemplary magnetometers that may be used as back up magnetometers 135, include, but are not limited to, miniature triaxial fluxgate sensor FLC 3-70 from Stefan Mayer Instruments in Germany, solid state magnetometers, proton precession magnetometers, pumped potassium magnetometers or other magnetometers known in the art. The back up D&I sensors 130 may be positioned as close as possible to the true orthogonal axes X, Y and Z, however one or more of the back up accelerometers 125 or back up magnetometers 135 may be positioned offset from the true orthogonal axes as described in detail below.

Before the probe assembly 7 is positioned downhole, calibration tests may be carried out to determine the effect of different physical and environmental factors, for example offset position of the back up D&I sensors 130 and temperature drift, on the sensor readings. One or more calibration tables compiled from the calibration test results may be utilized by the controller 106 to process readings taken from the back up D&I sensors 130 when the downhole probe assembly 7 is positioned downhole to determine the true orientation of the probe assembly during downhole operations. For example, one or more of the back up D&I sensors 130 may be positioned offset from the true X, Y and Z orthogonal axes in the modified D&I sensor module 100a, 100b, in the back up D&I sensor module 180, in the end cap structure 120, 121, or other structure which incorporates the back up D&I sensors 130. During calibration tests, the D&I sensor module 100a, 100b, 180 or end cap structure 120, 121 is positioned in the true orthogonal axes X, Y and Z on a calibration stand as is known in the art. Voltage readings from each of the back up D&I sensors 130 are taken for each orthogonal axis. These voltage readings can be compared to the output voltage setting provided by the manufacturer of the sensor to determine if there is a difference between the voltage reading obtained and the manufacturer specified output voltage for that sensor. This voltage difference (if any) is the offset voltage (electrical offset) which corresponds to the physical offset of that particular back up D&I sensor 130 from the orthogonal axis. When the downhole probe assembly 7 is positioned downhole the controller 106 can be programmed to factor in the offset voltage for voltage output readings obtained from the back up D&I sensors 130 to calculate the apparent voltage readings relating to the orthogonal axes X, Y and Z. The apparent voltage readings can be analysed by the controller 106 and calibrated for environmental factors such as temperature drift and the true orientation of each back up D&I sensor 130 determined in real time; which information can be transmitted to the surface as telemetry data. Linking or correlating the electrical offset of a sensor to the physical offset of that sensor allows for accurate analysis and interpretation of data from the back up D&I sensors 130 when one or more of the sensors is not in true orthogonal alignment. This beneficially provides flexibility in positioning of the back up D&I sensors 130, so that the sensors can be added to confined spatial areas without having to be in true orthogonal alignment. The positional offset of the back up D&I sensors 130 may be intentionally machined or manufactured in the modified D&I sensor module 100a, 100b, in the back up D&I sensor module 180, in the end cap structure 120, 121, or any other structure which incorporates the back up D&I sensors 130 to aid in the layout of the MWD tool. The D&I sensor module 100a, 100b, 180, end cap structure 120, 121, or other structure containing the back up D&I sensors 130 can be constructed and the sensors correlated off-site and then easily incorporated in the downhole probe assembly 7 on site.

A full cross calibration of the back up D&I sensors 130 and the primary D&I sensors 105 may also be performed before the downhole probe assembly 7 goes downhole. The calibration may be conducted under temperature variation to determine the effects of temperature drift. Such calibration methods are known in the art, for example R. Estes et al. Society of Petroleum Engineers (SPE) 19546; and United States patent publication 2009/0157341, which are incorporated herein by reference.

Referring now to FIG. 9, during operation information from the primary D&I sensors 105 comprising primary accelerometers 140 relating to the X, Y and Z axes and primary magnetometers 145 relating to the X, Y and Z axes is filtered, amplified and converted to digital information by an Analog-to-Digital converter 150. Each of the primary D&I sensors 105 gathers information independently from the other primary D&I sensors 105. Concurrent, but independent information from the back up D&I sensors 130 comprising back up accelerometers 125 relating to the X, Y and Z axes and back up magnetometers 135 relating to the X, Y and Z axes is filtered, amplified and converted to digital information by an Analog-to-Digital converter 150. Each of the back up D&I sensors 130 gathers information independently from the other back up D&I sensors 130. The Analog-to-Digital converter 150 may be the same converter for converting information from both the primary D&I sensors 105 and the back up D&I sensors 130 or different Analog-to-Digital converters may be utilized. The digital information from both the back up and primary D&I sensors is transmitted electronically to the controller 106 of the main circuit board 104 of the electronics subassembly 28 as discussed above with reference to FIG. 3. Information may be gathered continuously or intermittently from the primary D&I sensors 105, from the back up D&I sensors 130 or from both the primary and back up D&I sensors 105, 130. Intermittent gathering of information may conserve battery power. In current practices, the primary D&I sensors 105 are typically turned on to take periodic survey information, for example at every connection of a new portion of the drill pipe. The back up D&I sensors 130 could also be turned on for this periodic survey, but need not be turned on for toolface measurements.

Figure 10:
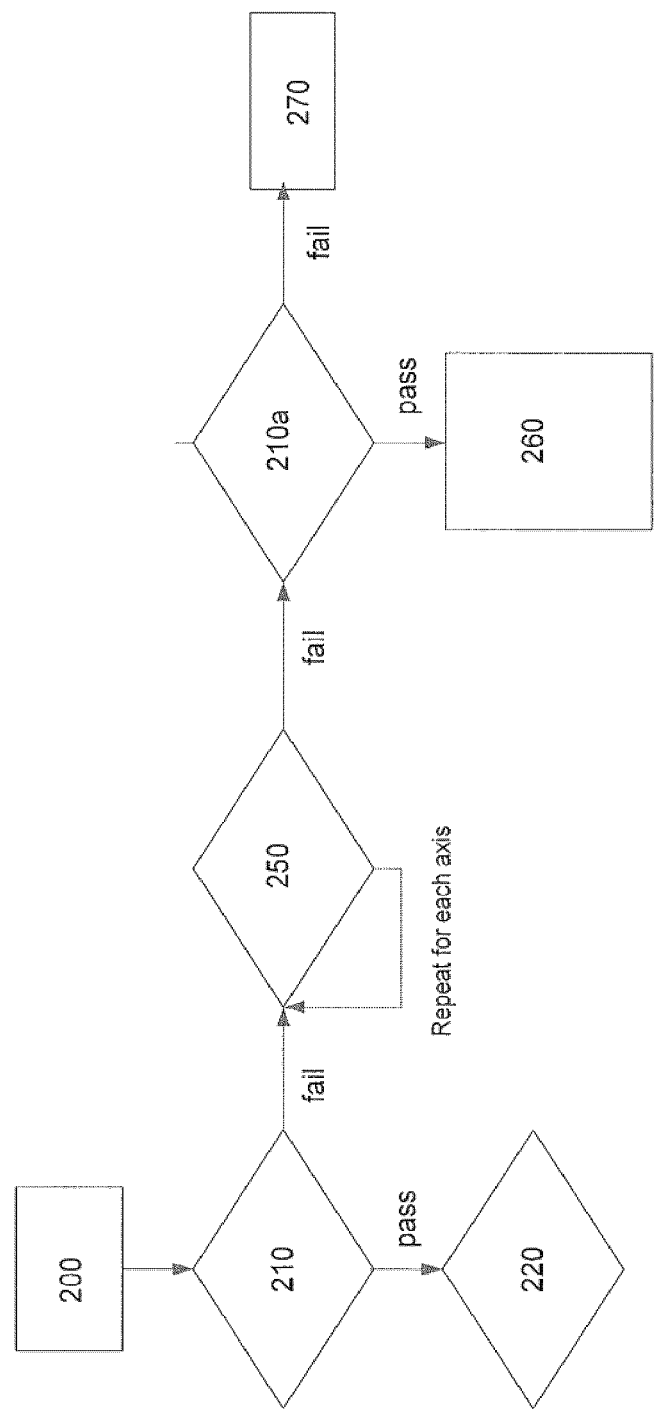
FIG. 10 is a schematic flow chart of a method of operation of the back up D&I sensors and the primary D&I sensors.
Figure 11:
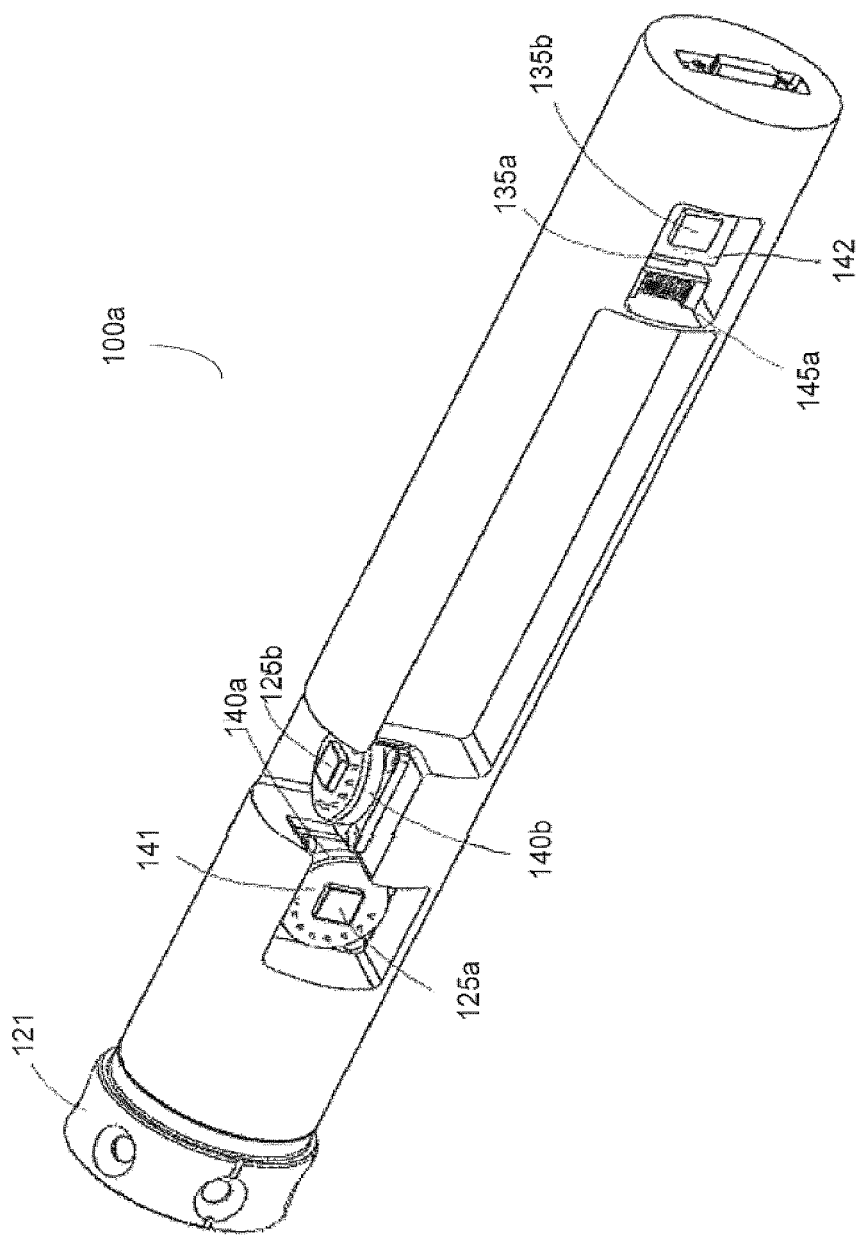
FIG. 11 is a perspective view of a modified D&I sensor module incorporating back up D&I sensors in accordance with another embodiment of the invention.
Figure 12B:
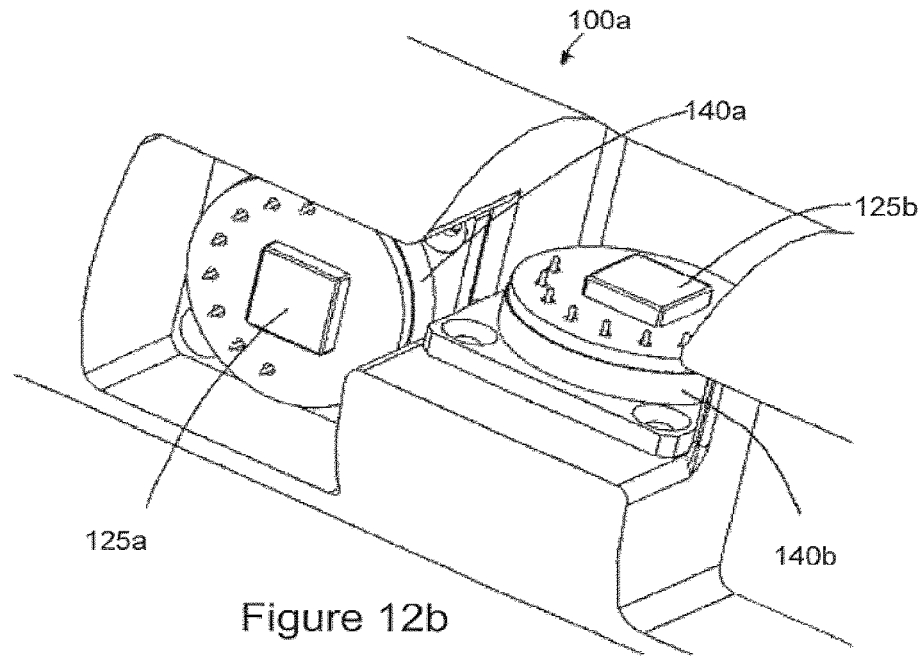
FIG. 12A is a partial perspective view of primary accelerometers of a D&I sensor module and FIG. 12B is a partial perspective view of back up accelerometers fixed to the primary accelerometers of the D&I sensor module of FIG. 12A.
Figure 12A:
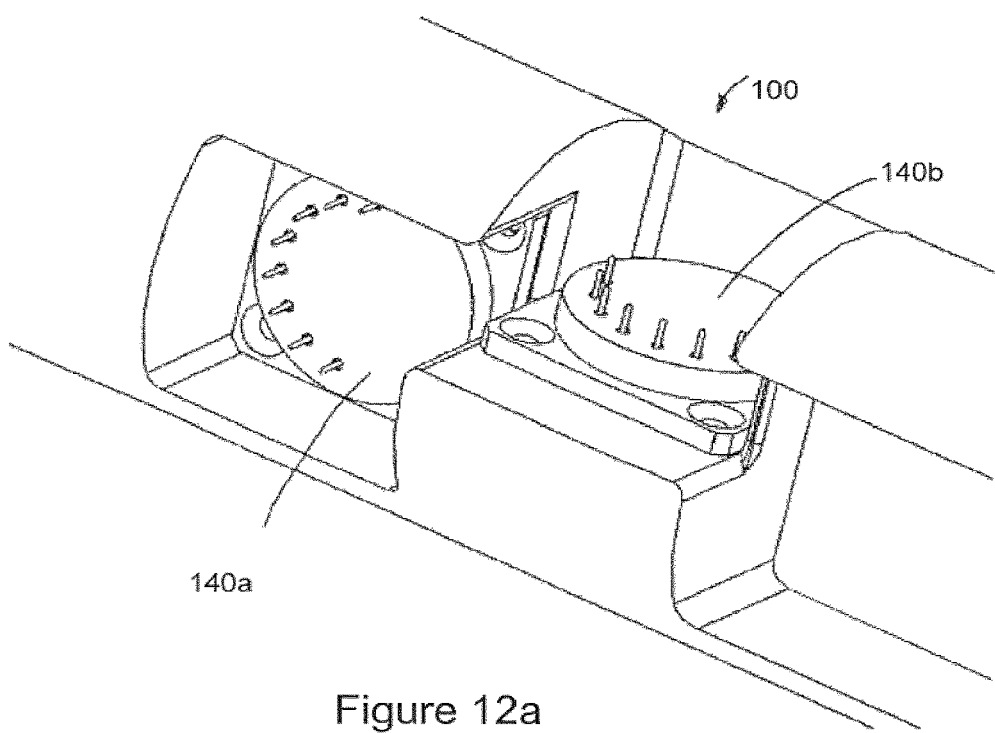
Figure 13B:
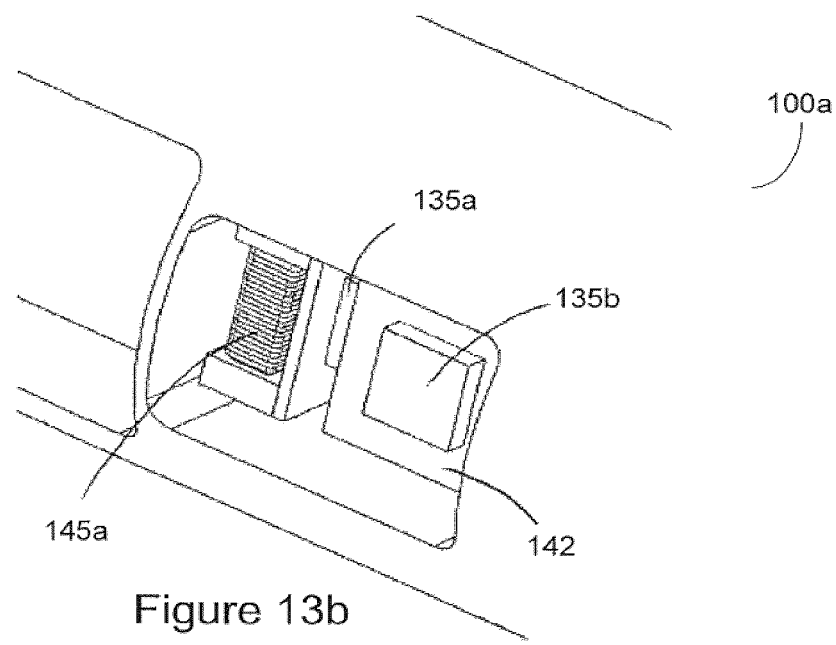
FIG. 13A is a partial perspective view of primary magnetometers of a D&I sensor module and FIG. 13B is a partial perspective view of back up magnetometers fixed to the primary magnetometers of the D&I sensor module of FIG. 13A.
Figure 13A:
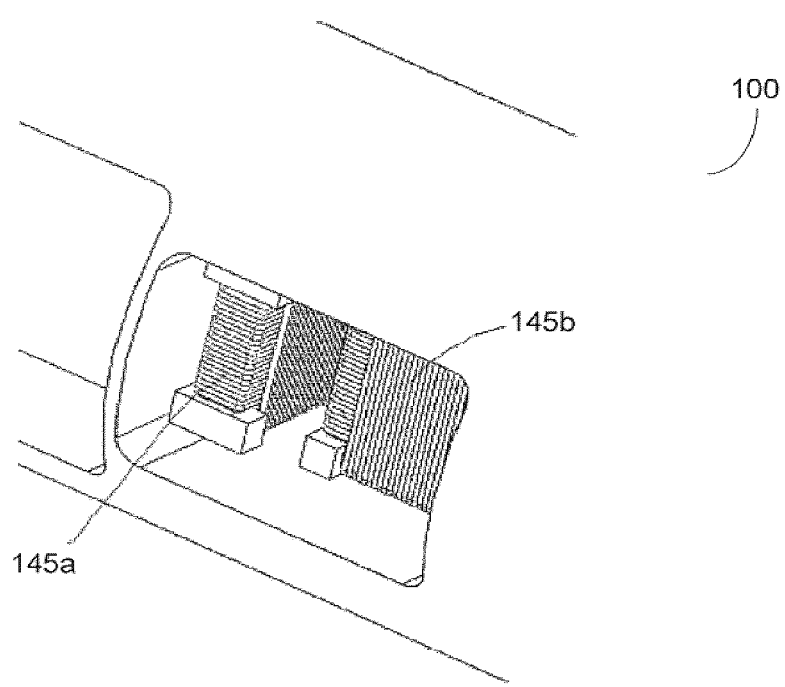
Figure 14A:
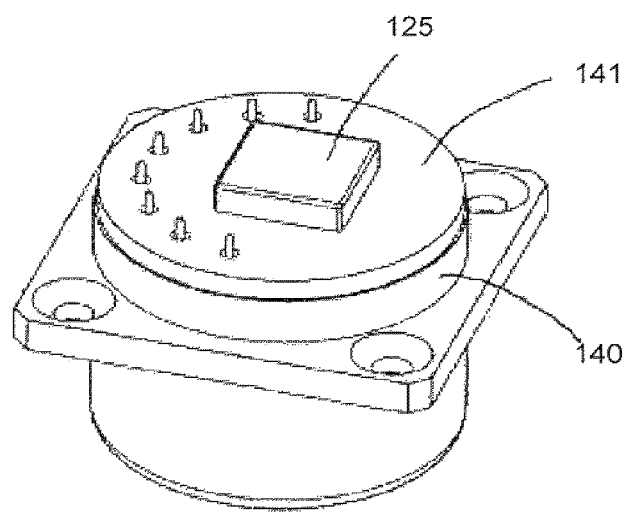
FIGS. 14A and 14B are a perspective fully assembled view and a perspective exploded view respectively of a back up accelerometer fixed to a primary accelerometer of the modified D&I sensor module of FIG. 11.
Figure 14B:
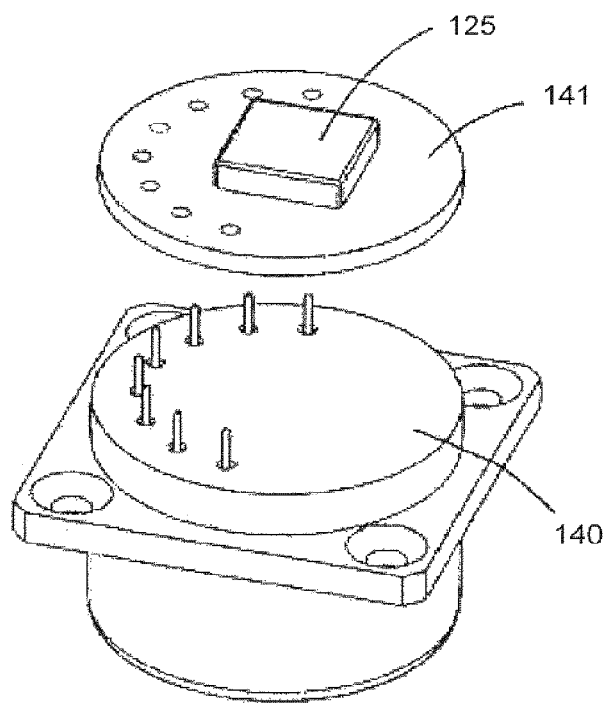
Figure 15A:
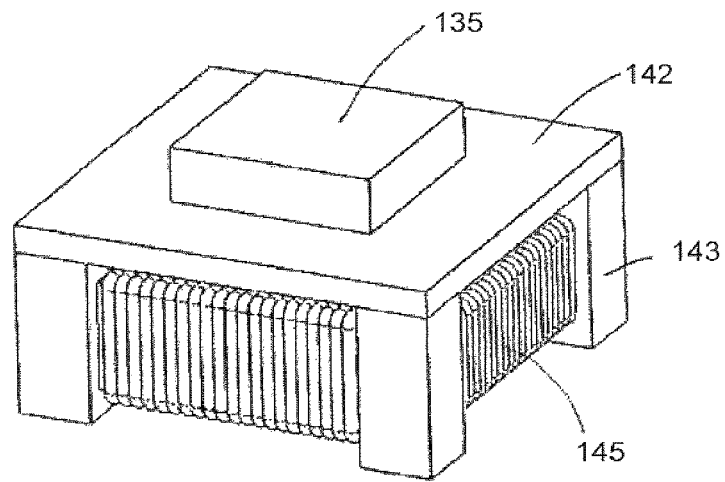
FIGS. 15A and 15B are a perspective fully assembled view and a perspective exploded view respectively of a back up magnetometer fixed to a primary magnetometer of the modified D&I sensor module of FIG. 11.
Figure 15B:
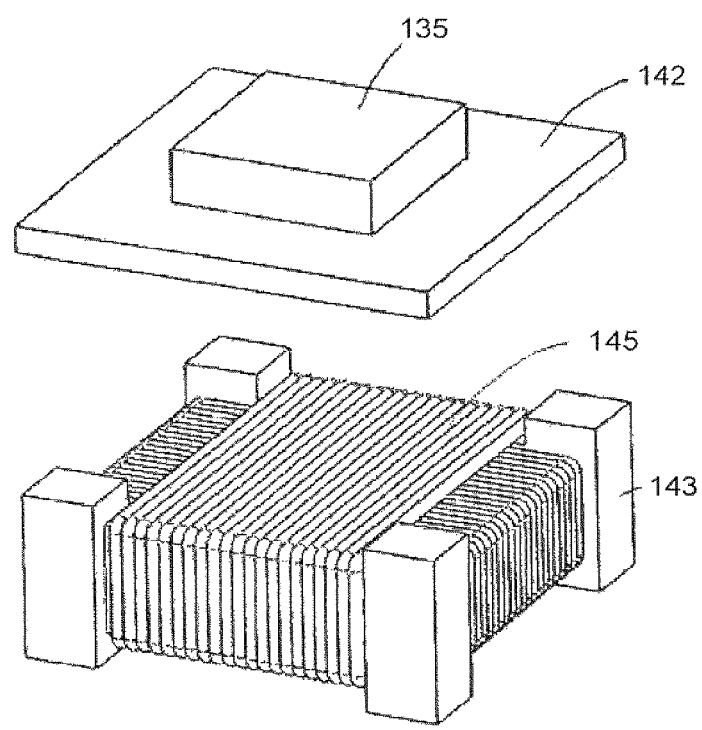

Referring now to FIG. 10, there is shown a schematic flow chart of a method of operation a downhole probe assembly comprising primary D&I sensors 105 and back up D&I sensors 130 in accordance with an embodiment of the present invention. During operation a sensor functionality assessment 200 is continuously or periodically carried out. The sensor functionality assessment 200 comprises a field qualification check 210 where information from each of the primary D&I sensors 105 downhole is compared to expected readings or other values to determine if the information is within a predetermined limit or range.

If the primary D&I sensor information is within the predetermined range (pass), then the primary D&I sensor information is compared to information from each of the back up D&I sensors 130 for a back up qualification check 220. If the primary D&I sensor information is outside the predetermined range (fail), then individual sensor checks 250 are carried out for each of the primary D&I sensor 105 by assessing the deviation from the previous reading for that individual primary D&I sensor 105 and comparing it to the individual reading from the corresponding back up D&I sensor 130. If one of the primary D&I sensor 105 fails the individual sensor check 250 then the offending sensor information is replaced with information from the corresponding back up D&I sensor 130 and a further field qualification check 210a carried out to determine if the back up information is within the predetermined range.

If the back up information fails the further field qualification check 210a then an alert 270 is sent to the operator at the surface indicating directional failure which necessitates a trip out of hole for repair or replacement of the primary D&I sensors 105. If the back up information passes the further field qualification check 210a then an alert 260 is sent to the operator at the surface indicating that information from the back up D&I sensors 130 is being utilized instead of information from the primary D&I sensors 105. The operator may also be alerted as to which of the primary D&I sensors 105 has failed. Even if there is failure of only one primary D&I sensor 105, information from all the back up D&I sensors 130 may be utilized instead of information from the primary D&I sensors 105 to ensure that there is corresponding aligned sensor information. At the surface, the operator will be aware that a higher tolerance for accuracy is required when using information from the back up D&I sensors 130 rather than information from the primary D&I sensors 105. The operator can monitor the uncertainty level of the back up D&I sensor information and if the uncertainty level becomes too high for tolerance, a decision may be made to trip out of hole and replace or repair the failed primary D&I sensor 105. Otherwise, drilling operation may continue using information from the back up D&I sensors 130 until a scheduled trip out.

The back up D&I sensors 130 therefore provide a back up system in case of failure of one or more of the primary D&I sensors 105, which back up system is cost effective and efficient at providing D&I measurement, albeit with less accuracy. The back up D&I sensors 130 may be less prone to damage and are therefore more reliable than the primary D&I sensors 105. If there is failure of one of the primary D&I sensors 105, it will still be necessary to trip out of hole and replace or repair the primary D&I sensors 105, however the trip out can be delayed until a convenient time as the back up D&I sensors 130 provide alternative D&I information needed for continuation of drilling operations. The system therefore provides the operator with knowledge regarding failure of the primary D&I sensor, as well how the back up D&I sensors 130 are performing prior to primary D&I sensor failure in order to instill confidence regarding the accuracy of information from the back up D&I sensors 130 when the need arises to solely rely on the back up D&I sensors 130. After each trip out, a re-survey is required, however the re-survey can be checked against the back up D&I sensor information to get position. As a result of not having to trip out to replace failed primary D&I sensors 105, time on site may be reduced. Drilling can be continued until a scheduled trip out of hole, thus avoiding unnecessary trips out and reducing operation costs.

In alternative embodiments (not shown) back up sensors could also be employed for other sensors utilized in the downhole probe assembly, for example back up sensors for the sensors included on the drilling conditions sensor module.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of the general concept.

What is claimed is:

1. A downhole probe assembly comprising:
   (a) primary sensors comprising primary accelerometers and primary magnetometers configured to gather information relating to each of orthogonal axes X, Y and Z;
   (b) back up sensors comprising back up solid state accelerometers configured to gather information relating to each of orthogonal axes X, Y and Z; and
   (c) a controller in electrical communication with the primary sensors and the back up sensors, the controller configured to receive and process information from the primary sensors and the back up sensors so that information from the back up accelerometers can be used when one or more of the primary accelerometers fails,
   wherein:
   the primary accelerometers are a different type of accelerometer than the back up solid state accelerometers;
   at least one of the back up solid state accelerometers is less accurate than the primary accelerometers; and
   at least one of the back up solid state accelerometers is less prone to failure than the primary accelerometers.

2. The downhole probe assembly of claim 1, wherein the controller is configured to send a signal to surface to alert an operator that one or more of the primary sensors has failed and that information is being provided by the back up sensors.

3. The downhole probe assembly of claim 1, wherein the back up sensors further comprise back up magnetometers configured to gather information relating to each of orthogonal axes X, Y and Z, wherein the controller is in electronic communication with the back up magnetometers and is configured to receive and process information from the back up magnetometers so that information from the back up magnetometers can be used when one or more of the primary magnetometers fails.

4. The downhole probe assembly of claim 3, wherein at least one of the back up magnetometers is less accurate than the primary magnetometers.

5. The downhole probe assembly of claim 1, wherein the back up sensors are incorporated in a back up sensor module and the back up sensor module is configured for interconnection with a longitudinally adjacent module of the downhole probe assembly.

6. The downhole probe assembly of claim 5, wherein the back up sensor module comprises a longitudinally extending housing enclosing a body, wherein the back up sensors are attached to the body.

7. The downhole probe assembly of claim 6, wherein the back up sensors are attached to the body in each of the orthogonal axes X, Y and Z.

8. The downhole probe assembly of claim 6, wherein one or more of the back up sensors is attached to the body of the back up sensor module at an offset position to the orthogonal axes X, Y and Z.

9. The downhole probe assembly of claim 1, including a downhole probe assembly module comprising a longitudinally extending housing enclosing a body, wherein the back up sensors are attached to the body.

10. The downhole probe assembly of claim 9, wherein the back up sensors are attached to the body in each of the orthogonal axes X, Y and Z.

11. The downhole probe assembly of claim 9, wherein one or more of the back up sensors is attached to the body at an offset position to the orthogonal axes X, Y and Z.

12. The downhole probe assembly of claim 9, wherein the back up sensors are fixed to printed circuit boards and the printed circuit boards are attached to the body.

13. The downhole probe assembly of claim 1, wherein the primary sensors and the back up sensors are incorporated in a sensor module.

14. The downhole probe assembly of claim 13, wherein the sensor module comprises a body and the primary sensors and the back up sensors are attached to the body.

15. The downhole probe assembly of claim 13, wherein the back up sensors are attached to the body in each of the orthogonal axes X, Y and Z, or one or more of the back up sensors is attached to the body at an offset position to the orthogonal axes X, Y and Z, or wherein at least one of the back up sensors is attached to the body on the back side of at least one of the primary sensors so that the at least one back up sensor and at least one primary sensor are in the same orthogonal axis.

16. The downhole probe assembly of claim 13, wherein the sensor module comprises a body and the primary sensors are attached to the body and at least one of the back up sensors is attached to at least one of the primary sensors.

17. The downhole probe assembly of claim 16, wherein the back up sensors are attached to the primary sensors in each of the orthogonal axes X, Y and Z.

18. The downhole probe assembly of claim 16, wherein at least one of the back up sensors is attached to at least one of the primary sensors at an offset position to the orthogonal axes X, Y and Z.

19. The downhole probe assembly of claim 16, wherein the back up sensors are fixed to printed circuit boards and the printed circuit boards are attached to the primary sensors.

* * * * *